United States Patent [19]
Nish et al.

[11] Patent Number: 5,138,867
[45] Date of Patent: * Aug. 18, 1992

[54] MULTI-USE FILL HEIGHT TEST DEVICES

[75] Inventors: Terry E. Nish; Cecil R. McCray, both of Salt Lake City, Utah

[73] Assignee: Servi-Tech, Inc., Salt Lake City, Utah

[ * ] Notice: The portion of the term of this patent subsequent to Apr. 30, 2008 has been disclaimed.

[21] Appl. No.: 775,665

[22] Filed: Oct. 11, 1991

Related U.S. Application Data

[63] Continuation of Ser. No. 643,864, Jan. 22, 1991, which is a continuation of Ser. No. 505,960, Apr. 6, 1990, Pat. No. 5,010,760.

[51] Int. Cl.⁵ .................................................. G01B 3/30
[52] U.S. Cl. .................................................. 73/1 H
[58] Field of Search .................. 73/1 H, 1 J, 865.9; 248/161, 411, 157, 186, 162.1, 404, 405, 406.1, 406.2, 407–410, 412–414; 108/144, 148, 150, 145–147

[56] References Cited

U.S. PATENT DOCUMENTS

| | | | |
|---|---|---|---|
| 1,379,129 | 5/1921 | Sejnoha | 108/148 |
| 3,017,183 | 1/1962 | Chalcroft | 248/161 |
| 3,115,849 | 12/1963 | Johnson | 108/144 |
| 3,341,197 | 9/1967 | Bottorff | 248/413 |
| 4,345,734 | 8/1982 | Studinger | 248/411 |
| 4,373,267 | 2/1983 | Lycan | 73/1 J |

FOREIGN PATENT DOCUMENTS

| | | | |
|---|---|---|---|
| 227652 | 10/1958 | Australia | 108/148 |
| 522827 | 10/1953 | Belgium | 108/150 |
| 2601639 | 1/1988 | France | 248/161 |
| 341297 | 1/1931 | United Kingdom | 248/413 |

*Primary Examiner*—Robert Raevis
*Attorney, Agent, or Firm*—Lynn G. Foster

[57] ABSTRACT

A novel device and related methods which provide manually adjustable standards and controls for quality inspection systems for filling and sealing equipment. The device provides an adjustable product height simulator which is used to calibrate and quality assurance test the performance of quality inspection systems on a filling and sealing line. The height simulation level is detectable without changing sensitivity of the quality inspection system's product level sensor. The device is readjustable for a plurality of uses, rugged for repeated multiple use, and does not degrade over time. Base and top (capping) characteristics provide further adjustable simulation comprising entrapped gas phase between the product and container cap, missing caps, and simulated container forms.

19 Claims, 2 Drawing Sheets

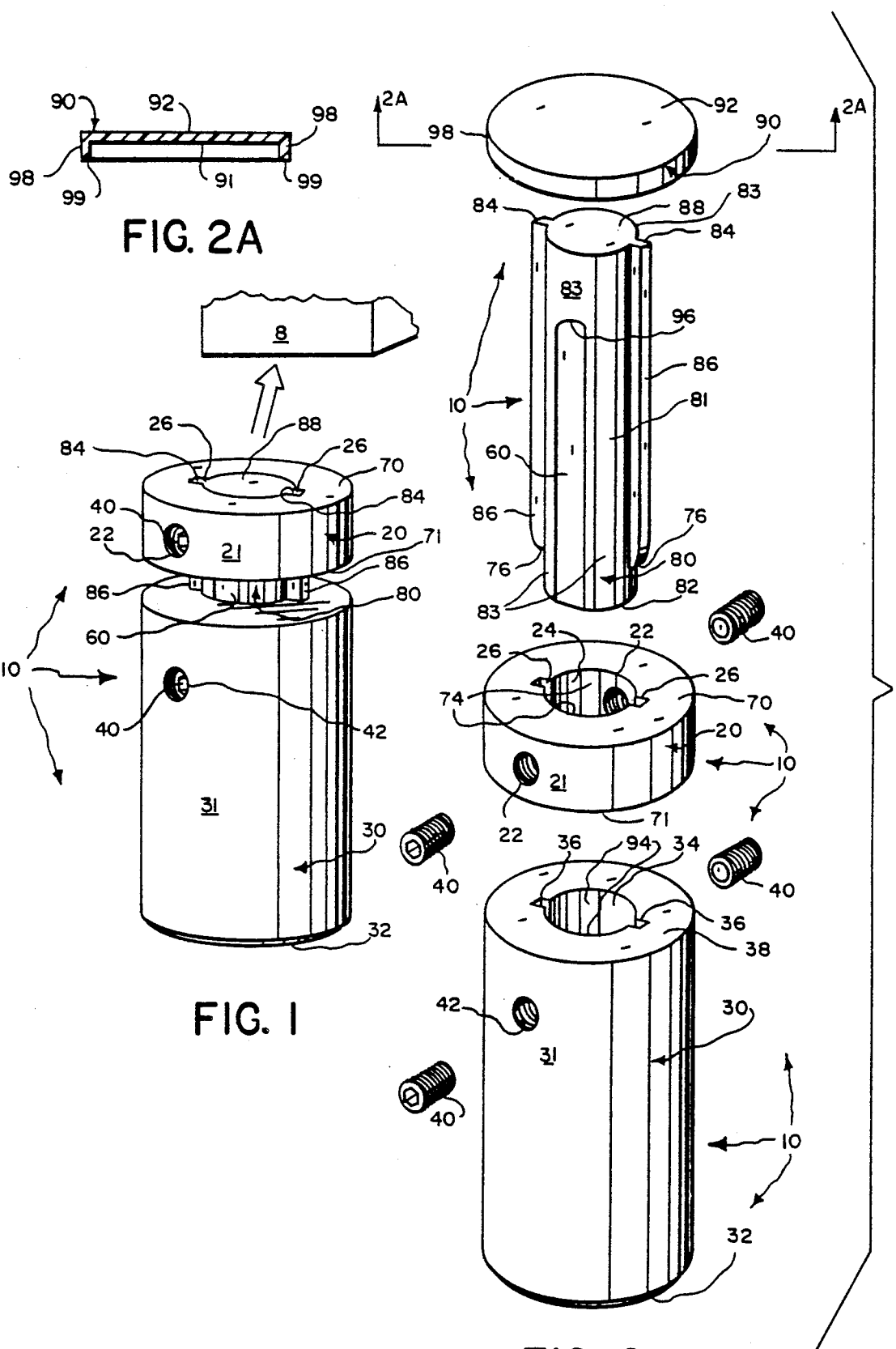

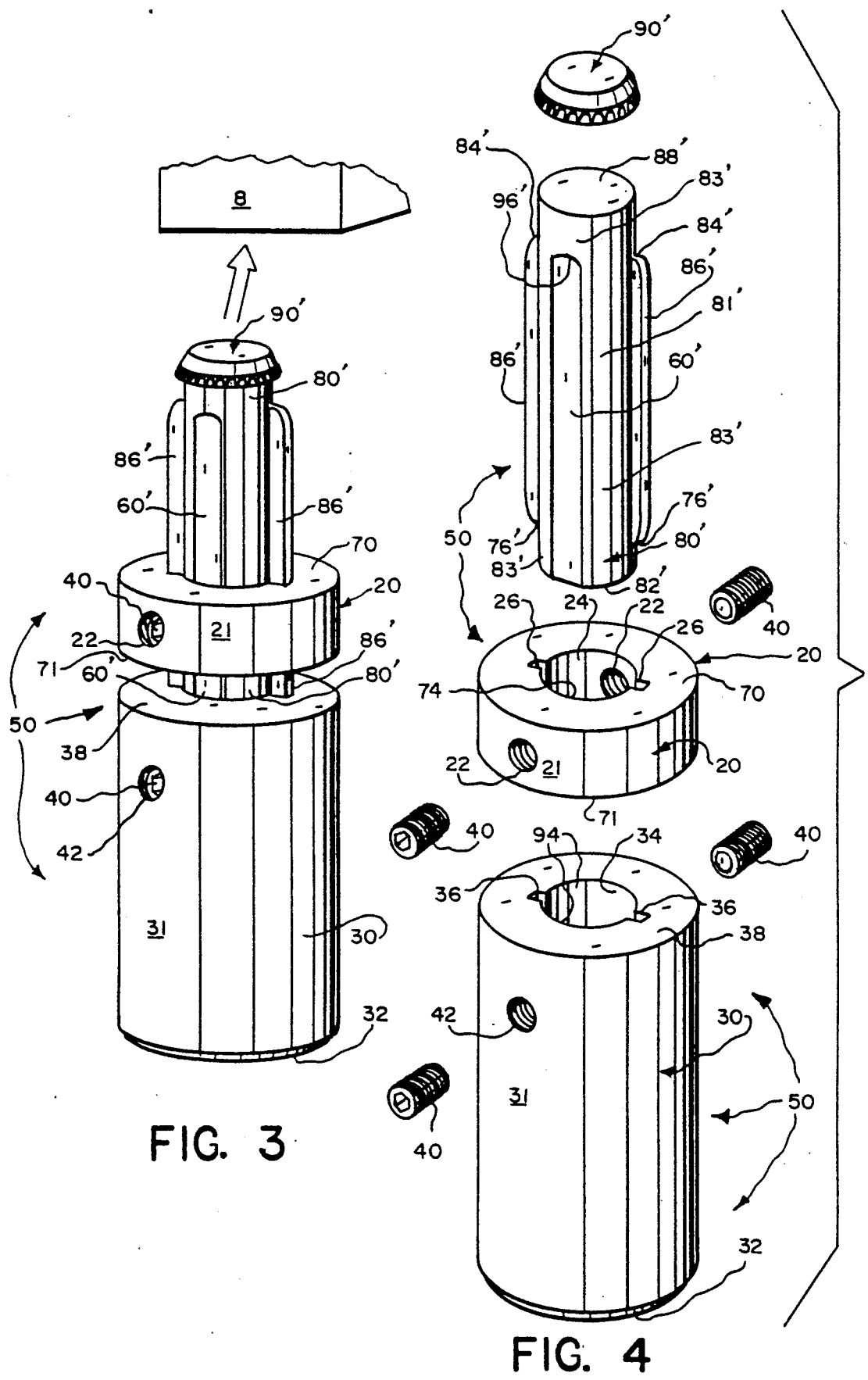

MULTI-USE FILL HEIGHT TEST DEVICES

CONTINUITY

This application is a continuation of our co-pending U.S. patent application Ser. No. 643,864, filed Jan. 22, 1991, which is a continuation of U.S. patent application Ser. No. 505,960, filed Apr. 6, 1990, now U.S. Pat. No. 5,010,760.

FIELD OF INVENTION

This invention relates to container filling and sealing equipment and more particularly to fill level calibration and control devices, and related methods, for quality control and inspection systems for container filling and sealing equipment.

PRIOR ART

In the containerized beverage and containerized food arts, an automated filling and sealing production line is often used for multiple container shapes and sizes and must accurately and repeatably fill each container with a particular product to levels and volumes which are individually and independently set for each product and container. In addition to setting the mechanical control parameters of the filling and sealing equipment to establish each specific fill level and volume, similar test or inspection parameters must be set for an associated quality inspection system. In order to reduce the costs related to setting and resetting each line and performing periodic inspection to assure quality, it is desirable to provide easily accessible stored reference standards and controls for the quality inspection system for line or run. As an example, it is common practice in the industry to require fill liquid fill volume accuracy to be within one-tenth of an ounce. Each time a line is newly set-up and periodically within each run, tests must be conducted to assure the established tight tolerance requirements are met.

In the past, it has been a practice to set fill levels using prefilled bottles, cans, or containers identical to those actually being used on a filling and sealing line to initially set and then periodically test the corresponding performance of the fill height quality inspection system. In this practice, one container is filled to a product level which represents the maximum underfill reject level. Another container is filled to a level which exceeds the maximum underfill reject level by an additional fill amount representing the minimum detection resolution of the quality inspection system for that container configuration. Procedurally, these containers have been the standards and controls used to calibrate the quality inspection system for fill level detection by which the fill level for a line for new containers has been established and by which fill level performance test has been periodically checked as part of a quality assurance test program run during filling and sealing.

A number of problems have been encountered through the use of the aforestated prior art practice which include difficulties in adjusting quality control equipment due to product sloshing, loss of accurate volumetric/height presentation due to denting and other malformation of the containers through use, breakage of expensive prototype containers during line set-up, and variations in fill height and other related measurement parameters due to aging during storage between runs.

A product which represents an early attempt to solve these and other problems was earlier provided by the assignee of the present invention, Servi-Tech, Inc. of Salt Lake City, Utah, in the form of a dimensionally static fill height test can. For each fill configuration, the static Servi-Tech, Inc. test can comprises three fixed height solid plastic simulated containers or cans which simulate three fluid levels, NO/GO (reject every time), GO/NO-GO (reject approximately half the time), and GO (pass every time). The simulated cans are made of high impact injection molded plastic, machined in calibrated increments to a customer's filling and sealing line requirements. Once machined, a calibrated top lid is statically permanently secured as the top of the simulated can, using an adhesive or the like, and engraved with the specific fill height to make a permanent static unit. Designed to meet requirements of liquid canning, thousands of these simulated cans have been sold. Using this type of fill height test system eliminates any further need for creation of replacement liquid filled test cans or simulations thereof. The simulated cans comprise the following additional features: (1) a hollow region below the top lid to simulate gas space above the liquid in a filled can when required by a liquid height measurement detection beam; (2) a body which is dimensionally the same as the actual container in use and which comprises enough weight for stable travel on a conveyor; and (3) a relieved can bottom surface which provides additional stability for travel on a conveyor. The simulated cans may be provided in any fixed size, such as eight, twelve, and sixteen ounce models.

In addition to fill height quality assurance, quality inspection comprises missing cap, high or cocked cap, missing lid, and bulged container testing.

The aforementioned static simulated can, however, presents problems of its own including customer errors in incorrectly permanently affixing the lid to the remained thereof and the inability to adjust the size thereof at later points in time to accommodate a different fill level.

BRIEF SUMMARY AND OBJECTS OF THE INVENTION

In brief summary, this novel invention alleviates problems related to quickly and accurately setting fill levels and/or other parameters for containers processed by filling and sealing (closure applying) equipment using a dynamic, adjustable simulated test container. This invention, therefore, provides novel, adjustable fill height test devices which are manually adjustable and used to calibrate run parameters the first time a line is set-up and then stored reuse each time the line is reset and each time a control test is necessary or advisable. In addition, when adjusted to be a specific, desired standard, any dynamic, adjustable simulated test container according to the present invention may be dimensionally used as a basis for the manufacture of additional disposable test containers for use as non-retrievable test containers in certain types of filling and sealing systems. In its presently preferred form, the invention comprises three major parts, i.e. a base support, an adjustable fill height gauge block, and an adjustable mounting stem or shaft which can be used to set container height. These parts combine to provide two manually adjustable equipment detectable height settings for automatically filling a continuous line of containers with liquid, food or the like.

It is common practice in the industry to measure fill level using scintillation tubes, which generate low energy gamma radiation to produce a fill measurement or reading for each successive container in a line of containers being filled with a desired substance. The present invention simulates not only a container, but a product-air interface near the top of the simulated container closely enough that no change in sensitivity of the height measurement gamma radiation sensor is required. The fill height feature of the present invention is manually adjustable and may securely but releasibly be affixed in a desired position at a height which determines the test level. The present invention also comprises a container height adjustment feature.

In practice, two or three preset adjustable simulated containers according to the present invention are typically used. One device is set to measure the maximum product height reject level, a level at which one hundred percent of containers filled to that level are rejected. A second device is set to measure a product height which is greater than the maximum product height reject level by a distance equal to the quality inspection system's minimum detection resolution, a level at which one hundred percent of the containers filled to that level pass. Optionally, a third device is set to measure a product height between the first two devices, a level at which some containers pass and the rest are rejected. Different colored test containers or parts thereof may be provided to allow devices set for different measurement parameters to be visually differentiated and selected by the user. Also, where the adjustable test containers replicate long necked bottles they may each be crowned with a bottle cap for testing bottle capping inspection parameters.

It is a paramount object of the present invention to provide novel structure and methods which overcome or alleviate the aforestated problems of the prior art and by which fill levels and/or other parameters for container filling and sealing (closure applying) equipment is established with accuracy and precision.

It is also a primary object to provide manually adjustable fill height test devices in the form of simulated containers by which filling and sealing equipment is calibrated to cause each in a line of containers to be correctly filled.

It is a key object to provide one or more fill height test devices each of which is manually adjustable and which retains the adjustment against inadvertent change accommodating periodic reuse.

It is a further key object to provide a fill height test device which is durable and has a long life expectancy.

It is a fundamental object to provide one or more manually adjustable simulated containers, each of which is used to calibrate container heights and fluid levels for container filling and sealing equipment.

It is a elemental object to provide an adjustable simulated container which comprises a base suitable for stable travel on a conveyor or the like.

It is a main object to provide a manually adjustable multiple part device for calibration of container filling and sealing equipment.

It is a chief object to provide parts for manually set and adjustable calibrating devices in an assortment of colors such that devices of different manual settings are visually distinguishable any one from another.

It is a significant object to provide a selectively set, manually adjustable container simulator the setting of which is detectable by a product fill height detector and which requires no change in sensitivity of the detector when the simulator is used as a standard or control.

It is an important object to provide an adjustable fill height device in the form of a simulated narrow neck bottle which comprises a bottle cap for filling and sealing calibrations of equipment which inspects bottles upon which bottle caps have been superimposed.

It is an further important object to provide an adjustable fill height simulated container which does not slosh due to conveyor movement and vibration.

These and other objects and features of the present invention will be apparent from the detailed description taken with reference to accompanying drawings.

BRIEF DESCRIPTION OF THE DRAWINGS

FIG. 1 is an isometric view of a can simulating fill height test device fashioned according to the principles of the present invention;

FIG. 2 is an exploded isometric view of the fill height test device for cans seen in FIG. 1, with an optional cap added;

FIG. 2A is a cross-section taken along lines 2A—2A of FIG. 2;

FIG. 3 is an isometric view of a bottle simulating fill height test device fashioned according to the principles of the present invention; and FIG. 4 is an exploded isometric view of the fill height test device shown in FIG. 3.

DETAILED DESCRIPTION OF THE ILLUSTRATED EMBODIMENTS

Reference is now made to the embodiments illustrated in FIGS. 1–4 wherein like numerals are used to designate like parts throughout.

The first presently preferred embodiment of the invention comprises an assembled, can simulating, free-standing, fill height test device, generally designated 10 and best shown in FIG. 1. An exploded view of the same device is shown in FIG. 2, where an optional cap 90 is also depicted. As can be clearly seen in FIG. 2, parts for test device 10 comprise base support member, generally designated 30, releasible fasteners in the form of four retention set screws 40, fill height gauge block, generally designated 20 and a shaft, mast or column member, generally designated 80. As mentioned, the cap 90, shown in FIG. 2, is optional.

Base support member 30 is preferably made of high impact injection molded synthetic resinous material, which causes the test device to be free-standing and comprises enough weight to provide stability for the entire simulated container 10 during use when placed upon a moving conveyor or the like. While the form of base support 30 is shown to be cylindrical in shape, the invention embraces all shapes utilized as fillable containers. The support member 30 comprises an exterior cylindrical surface 31 and spaced inside arcuate surfaces 94. The wall between surface 31 and surfaces 94 is, with two exceptions mentioned below, illustrated as being of uniform thickness.

Opposed threaded bores 42, only one of which is not shown, are provided in the wall forming member 30 and each extends from surface 31 to one of the surfaces 94. Each bore 42 receives a set screw 40, as will be discussed in detail later. The hollow center defined by surfaces 94 comprises a smooth blind bore 34 which extends vertically downwardly along the longitudinal axis of the member 30 from top surface 38 to a point a small distance above contoured base support bottom surface 32 sufficient to maintain structural integrity. The circular nature of bore 34 is interrupted by two oppositely positioned internal grooves 36 which extend radially into the wall of member 30. Thus, opposed keyways at 36 are provided. Base support contoured bottom surface 32 preferably comprises a relieved configuration which replicates the bottom surface of a beverage can or the like for by which the device 10 is caused to be free-standing upon a desired surface and will stably travel on a conveyor or the like surface in its free-standing condition.

Shaft member 80 is preferably made from high impact injection molded synthetic resinous material and comprises a central vertical shaft 81 comprising cylindrical surface segments 83. Two opposed, radially protruding longitudinally directed keys 86 interrupt the surfaces 83. The keys 86 are sized, shaped and located to accommodate linear displacement along keyways 36 of member 30 as the shaft 81 is linearly inserted into bore 34. When the shaft 81 is so inserted into bore 34 the fit is preferably snug but not tight.

The shaft member 80 comprises a flat transverse bottom surface 82 and a flat transverse top surface 88. Each key 86 is illustrated as extending from the top surface 88 at points 84 to sites 76 located above the bottom surface 82.

Two oppositely directed identical flats 60, only one of which is shown, are interposed between surface 83 on opposite sides of the shaft 81, and are provided to contiguously receive retention set screws 40 in abutting relation. Flats 60 are formed parallel to the planes of protruding keys 86 and normal to the axis of each set screw 40, when assembled. Each surface 60 is so dimensional that any damage incurred by any set screw 40 will not adversely affect travel of shaft 80 in bore 34 keyways 94. Each flat 60 extends to bottom surface 82, but does not extend the full length of shaft 80 to top surface 88. Instead each flat 60 begins a predetermined distance below top surface 88 at site 96, such that the cylindrical nature of the top part of shaft member 80 is maintained, exclusive of keys 86. Thus, each flat 60 in shaft 80 begins at a site 96, which is sufficiently above the highest possible position of a tightened retention screw 40 that raising and scoring material at the top of flat 60 which would or might adversely affect travel of shaft 80 in bore 34 is avoided.

Fill height gauge block 20 is annular-shaped and comprises a solid wall defining exterior arcuate surface 21 and interior arcuate surfaces 74. The diameter of surface 21 is illustrated as being the same as the diameter of surface 31 and the diameter of surfaces 94 the same as surfaces 74. Block 20 also comprises a flat transverse bottom surface 71 and a flat transverse top surface 70. Surface 70 is the surface interpreted by product height sensors of a quality inspection system as if surface 70 where the top surface of a product dispensed into a container. Thus, annulus 20 at surface 70 simulates a fill level of product in a container. Block 20 is preferably formed of high impact synthetic injection molded resinous material, which has proved to have both the rugged physical and air-to-surface interface characteristics to accommodate repeated use without undue wear or damage, without requiring recalibrating or other alteration of the sensitivity of the product level sensor of the associated quality inspection system. Fill height gauge block 20 comprises two opposing threaded bores 22 disposed in the wall comprising block 20 and extending between surfaces 21 and 70, Each bore 22 receives one of the retention screws 40. Fill height gauge block 20 also comprises axial bore 24 which is interrupted by two opposed internal longitudinally directed grooves 26. The diameter of bore 24 is illustrated as being the same as the diameter of bore 94 and slots 26 are sized, shaped and located as are slots 36. Note that a plane containing slots 26 and 36 is disposed normal to the axis of each threaded bore 22 and 42. Thus, entry of each retention screw 40 through its associated threaded 22, 42 directly opposes an associated flat 60 of the shaft member 80.

Assembling of test device 10 involves telescopic, nonrotatable interrelating parts and comprises linear insertion of shaft member 80 through fill height gauge block 20 and into the base member 30 such that shaft member 80 is in a vertically erect position, surfaces 88 and 70 are coplanar and keys 86 are aligned with keyways 26 to prevent relative rotation of block 20 and shaft 80. Two set screws 40 are inserted into threaded bores 22 and tightened against the associated flats 60 while the coplanar relationship between surfaces 88 and 70 is retained. Bottom 82 of shaft member 80 is linearly inserted into base support 30 bore 34 with keys 86 and keyways 36 aligned to prevent relative rotation until the height represented by the distance from base support bottom 32 to coplanar surfaces 88 and 70 is the desired fill height. At this point, a retention screw 40 is inserted into each threaded bore 42 and tightened against the associated flat 60. An uncapped simulated fill height calibrating can is thus ready for use.

If it is desired to simulate a can comprising a lid, for reasons comprising triggering requirements of product level measuring equipment, cap 90 is used. Cap 90 comprises a top layer of uniform thickness comprising top surface 92 and bottom surface 91 and an annular, downwardly extending flange 98, ending in edge 99 which defines an internal recess between flange 98 and surface 91, which is required by some measurement equipment. The height of flange 98 of cap 90 is sized to provide a recess adjacent bottom surface 91 which simulates that found in filled containers.

Another presently preferred embodiment of the invention is illustrated in FIGS. 3 and 4 and comprises a bottle simulating, free-standing, fill height test device 560. As can be clearly seen in FIG. 4, parts for test device 50 comprise the above-described base support member 30, four releasable fasteners in the form of the described retention set screws 40, the described fill height gauge block 20, shaft, mast or column member 80', and bottle cap 90'. Where parts of device 50 are illustrated as being the same as those which comprise device 10 like numbers have been used and no further description of these parts is necessary.

Shaft member 80' comprises a vertical shaft 81' comprising a general cylindrical shape with two producing radially-directed keys 86' (external flanges) which, together, comprise a horizontal silhouette which insertably fits and slides into bores 24 and 34. Keys 86' each extend from a top site 84', which is sufficiently below top surface 88' of the shaft member 80' to accommodate placement of bottle cap 90' over the top end of shaft member 80', to a lower site 76'. Shaft top surface 88' is illustrated as being flat and transverse to the axis of member 80'. The edges of top 88' are preferably rounded.

Two opposing flats 60' (one is not shown) are provided to engage the distal edge of retention set screws 40. Flats 60' are parallel to the plane of protruding keys 86', but are 90 degrees from the keys 86'. The surface are of each flat 60' of shaft member 80' is large enough so that scoring and other damage caused by tightening retention screws 40 will not adversely affect travel of shaft 80' in bore 94. Each flat 60' does not run the full length of shaft 80', but begins at site 96', located a distance below top 88', such that op 88' retains a circular form. In other words, site 96 of flat 60' begins at a point sufficiently above the highest possible position of a tightened retention screw 40 to avoid scoring and other damage at the top of flat 60' which will adversely affect travel of shaft 80' in bore 34.

As stated before, the top surface 70 of fill height gauge block 20 is the critical surface interpreted by product height sensors of a quality inspection system as if it were the top surface of product placed in a container.

Assembling of test device 50 involves telescopically and nonrotatably interrelating parts and begins with vertically erect, linear insertion of shaft member 80' into the bore 34 of base support member 30 with keys 86' aligned with keyways 36 to prevent relative rotation until top surface 88' is located at the desired bottle height. Two set screws 40 are inserted into threaded bores 42 and tightened against associated flats 60' to retain shaft member 80' at the desired height. Fill height gauge block 20 is linearly inserted at bore 24 over shaft member 80' with keys 86' and keyways 26 aligned to prevent rotation, and lowered until the height represented by the distance from base support bottom 32 to planar surface 70 is the desired fill height to be simulated by device 50. At this point two retention screws 40 are inserted into threaded bores 22 and tightened against associated flats 60'. The uncapped fill height measurement device 50 is thus ready for use.

If a bottle cap is desired, for reasons comprising inspecting for missing or high/cocked caps, cap 90 is compressibly or adhesively applied to the top region of shaft member 80'.

In use, at least two models of each free-standing device 10 and 50 are employed in fill level calibration of automated contained filling, closure applying and sealing equipment, shown diagrammatically at 8 in FIGS. 1 and 3. A first model comprises a NO GO product height level wherein the distance between base support bottom 32 and planar surface 70 is set to the maximum rejectable product height. At this maximum rejectable level one hundred percent of the tests in said equipment using the present test devices results in rejection. A second model, usually made from parts of a different color, is adjusted to be a GO (i.e. one hundred percent of the tests on the second model result in a pass). The GO height is located above the NO GO a distance which comprises the detection resolution of the quality inspection system. In practice, an iterative process of repeated testing and height adjustment is required to finely tune each model to meet the one hundred percent GO/NO GO criteria. Optionally, a third model is assembled which comprises a base support bottom 32 to planar surface distance which is intermediate between the GO and NO GO heights providing a device which passes a portion of the time and is rejected the rest of the time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

What is claimed and desired to be secured by Letters Patent is:

1. A combination comprising a container filling and closure applying apparatus and an adjustable fill height test device which simulates a container filled with material to a predetermined level by which the container filling and closure applying apparatus is calibrated, the adjustable fill height test device comprising:

a base for stably supporting the test device, said base comprising means for contiguously engaging a supporting surface upon which the test device rests;

a column which is supported and held in an erect vertically-extending condition by the base;

means for simulating a fill level, the fill level simulating means being supported by the column;

means by which the elevation of the fill level simulating means are adjusted and secured in respect to the base to a location above said base which accurately simulates the desired fill level of a container.

2. The combination according to claim 1 further comprising means by which the base and the column are telescopically interrelated.

3. The combination according to claim 2 wherein the means which telescopically interrelate the base and the mast prevent relative rotation of the column and the base.

4. The combination according to claim 2 wherein the means which telescopically interrelate the base and the mast further comprise releasible fastening means interposed between and which releasibly securely join the base and the column whereby the relative positions of the base and the column are selectively releasibly set by a user.

5. The combination according to claim 4 wherein the releasible fastening means comprise at least one set screw.

6. The combination according to claim 1 further comprising means by which the column and the fill level simulating mean are telescopically interrelated.

7. The combination according to claim 6 wherein the telescopically interrelating means prevent relative rotation of the column and the fill level simulating means.

8. The combination according to claim 6 further comprising means interposed between the column and the fill level simulating means by which the relative positions of the column and the fill level simulating means are selectively releasibly set by a user.

9. The combination according to claim 8 wherein the releasible fastening means comprise at least one set screw.

10. The combination according to claim 1 further comprising means for simulating a container closure disposed at the top of the test device which simulate a top closure of the container.

11. The combination according to claim 10 wherein the container closure simulating means comprise means for simulating a can lid.

12. The combination according to claim 10 wherein the container closure simulating means comprise means for simulating a bottle cap.

13. A combination comprising container filling and closure applying equipment and an adjustable fill height test device which simulates a container filled with material to a predetermined level for calibrating the container filling and closure applying equipment, said adjustable fill height test device comprising:

a base for structurally supporting the device by engaging a supporting surface, a mast, means simulating a height of the container, means for joining the base and the container height simulating means, and means for preventing relative rotation but accommodating relative reciprocation of the container height simulating means and the base;

releasible fastening means interposed between the base and the container height simulating means by which the relative positions of the mast and the container height simulating means are releasibly set;

a fill height gauge for simulating a desired fill height of the container, means for engaging the mast and means for preventing relative rotation of the fill height gauge relative to the mast whereby the relative positions of the fill height gauge and the mast may be varied only rectilinearly;

means for releasibly fastening together the fill height gauge and the mast whereby the relative positions of the fill height gauge and the mast are releasibly set to simulate a desired container fill level.

14. The combination according to claim 13 wherein the mast, the fill height gauge, and the base each comprise color coded synthetic resinous material.

15. The combination according to claim 13 wherein the releasible fastening means comprise a plurality of screws, each carried in a threaded bore disposed in the base and which are each caused to bear against a surface of the mast when appropriately rotated in the threaded bores.

16. The combination according to claim 13 wherein the means for structurally defining the base comprises a contoured bottom surface which simulates the bottom surface of the container.

17. The combination according to claim 13 wherein the base, the mast, and the fill height gauge each comprise a separately injection molded part of synthetic resinous material.

18. A method of calibrating a container filling and closure applying apparatus comprising the steps of:
 a. providing at least one fill height simulating device;
 b. physically adjusting one solid fill height simulating component of the fill height simulating device in respect to a second solid component to change the elevation of the simulated fill height level of the fill height simulating device to set a desired fill height;
 c. processing the fill height simulating device through the container filling and closure applying apparatus whereby the simulated level is measured by the container filling and closure applying apparatus;
 d. calibrating the container filling and closure applying apparatus from measurements made in the processing step.

19. A method of testing filling level test limits of a container filling and closure applying apparatus comprising the steps of:
 a. providing at least one fill height simulating device;
 b. adjusting one solid fill height simulating component of the device to change the elevation of the simulated fill height level of the fill height simulating device to set a desired test limit;
 c. processing the fill height simulating device through the container filling and closure applying apparatus whereby the simulated material level is measured by the container filling and closure applying apparatus;
 d. failing the test if the measurement made by the container filling and closure applying apparatus is inconsistent with the adjusted elevation of the simulated fill height level.

* * * * *